United States Patent
Saha et al.

(10) Patent No.: US 7,133,902 B2
(45) Date of Patent: Nov. 7, 2006

(54) TRANSMITTING ACKNOWLEDGEMENTS USING DIRECT MEMORY ACCESS

(75) Inventors: Debashis Saha, Foster City, CA (US); John Ciminski, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 472 days.

(21) Appl. No.: 10/641,513

(22) Filed: Aug. 14, 2003

(65) Prior Publication Data
US 2004/0117368 A1 Jun. 17, 2004

Related U.S. Application Data

(60) Provisional application No. 10/323,561, filed on Dec. 17, 2002.

(51) Int. Cl.
G06F 15/167 (2006.01)
G06F 15/16 (2006.01)

(52) U.S. Cl. .......................... 709/212; 709/229; 710/22

(58) Field of Classification Search ................ 709/212, 709/224, 226, 229; 710/22, 36, 308
See application file for complete search history.

(56) References Cited

U.S. PATENT DOCUMENTS

| | | | | |
|---|---|---|---|---|
| 4,914,653 | A * | 4/1990 | Bishop et al. | ............... 370/462 |
| 5,535,345 | A * | 7/1996 | Fisch et al. | .................. 710/305 |
| 5,968,115 | A | 10/1999 | Trout | |
| 6,065,037 | A | 5/2000 | Hitz et al. | |
| 6,075,938 | A | 6/2000 | Bugnion et al. | |
| 6,112,304 | A | 8/2000 | Clawson | |
| 6,560,641 | B1 | 5/2003 | Powderly et al. | |
| 6,980,518 | B1 * | 12/2005 | Sun et al. | .................... 370/235 |
| 7,031,904 | B1 * | 4/2006 | Wilson et al. | .............. 709/230 |
| 7,039,600 | B1 * | 5/2006 | Meek et al. | .................... 705/14 |
| 2002/0199040 | A1 * | 12/2002 | Irwin et al. | ................... 710/22 |
| 2003/0018702 | A1 | 1/2003 | Broughton et al. | |
| 2004/0039775 | A1 | 2/2004 | Yoshida et al. | |
| 2004/0064815 | A1 * | 4/2004 | Uzrad-Nali et al. | ........ 718/102 |
| 2004/0117375 | A1 | 6/2004 | Saha et al. | |

OTHER PUBLICATIONS

European Patent Office, "Communication Pursuant to Article 96(2) EPC," App. No. 03814733.6, 5 pgs.
Current Claims, App. No. 03814733.6, 8 pages.

(Continued)

*Primary Examiner*—Ario Etienne
*Assistant Examiner*—El Hadji M. Sall
(74) *Attorney, Agent, or Firm*—Hickman Palermo Truong & Becker LLP; Christopher J. Brokaw

(57) ABSTRACT

Direct memory accessed is used to perform database operations between two or more machines. Data is read from a first buffer located on a first machine. The data was written into the first buffer in response to the data being written into a second buffer at a second machine. In one embodiment, based, at least in part, on whether the data represents a partial read, a determination is made as to whether to transmit, to the second machine, an explicit acknowledgement that the data was read from the first buffer. In another embodiment, based on whether the amount of unacknowledged data received by the first machine from the second machine exceeds a threshold quantity, a determination is made as to whether to transmit, in response to the data being read from the first buffer, any acknowledgement that the data was read from the first buffer.

14 Claims, 8 Drawing Sheets

OTHER PUBLICATIONS

International Preliminary Examining Authority, "Notification of Transmittal of the International Preliminary Examination Report," PCT/US03/39555, 11 pages.
International Searching Authority, "Written Opinion," PCT/US03/39555, dated Aug. 26, 2005, 9 pages.
International Searching Authority, "Notification of Transmittal of the International Search Report or the Declaration," PCT/US03/39555, dated Aug. 16, 2005, 6 pages.
Current Claims, PCT/US03/39555, 8 pages.
Dell Computer Corporation, "Infiniband Architecture: Next-Generation Server I/O," White Papter, Oct. 2000, XP-00242048, pp. 1-10.
Jang, Saqib, "'Beyond Gigabit' Networking and Next-Generation Network-System I/O Standards. Comparative Positioning of Infiniband and RDMA over TCP," A Margalla Communications Special Report, Nov. 2002, XP-002334409, pp. 1-17.
Sapuntzakis, C. et al., "The Case for RDMA," Internet Draft, Dec. 2000. XP-002961878, pp. 1-12.
Scott, Heidi et al., "A Study of the Impact of Direct Access I/O on Relational Database Management Systems," Proceedings of the 2002 Conference of the Centre for Advanced Studies on Collaborative Research, Sep. 30, 2002, XP-002330541, pp. 1-10.
Zhou, Yuanyuan et al., "Experiences with VI Communication for Database Storage," Proceeding of the 29th International Symposium on Computer Architecture, Anchorage AL, May 25-29, 2002, XP-001110063, pp. 257-268.
Jeff Silberman, et al., "User-Mode I/O in Oracle 10G with ODM and DAFS," undated, Paper #36777, http://otn.oracle.com/deploy/availability/pdf/ow_user-mode_doc.pdf, 12 pages.
Sharonn, "Chapter 5: Direct Memory Access," Jun. 24, 1997, http://webclass.cqu.edu.au//Units/81120_FOCT_Hardware/Study_Material/Study_Guide/chap5/, 6 pages.
Raja Srinivasan, Oracle Corporation, "Achieving Mainframe-Class Performance on Intel Servers Using InfiniBand Building Blocks," an Oracle White Paper, Apr. 2003, http://otn.oracle.com/deploy/availability/pdf/oracle_IB.pdf, 10 pages.

* cited by examiner

SENDING AN IMPLICIT ACKNOWLEDGEMENT MESSAGE

TRANSMITTING ACKNOWLEDGEMENTS USING DIRECT MEMORY ACCESS

CROSS REFERENCE TO RELATED APPLICATION

This application is a continuation-in-part application that claims the benefit of U.S. non-provisional patent application, Ser. No. 10/323,561, filed Dec. 17, 2002, the entire contents of which is hereby incorporated by reference as if fully set forth herein.

FIELD OF THE INVENTION

The present invention generally relates to direct memory access communications between two or more machines, and more specifically, to using the transmission of acknowledgements in response to the reading of data in a direct memory access buffer.

BACKGROUND OF THE INVENTION

Direct Memory Access (DMA) is a technique for transferring data from one memory segment to another memory segment without passing the data through a central processing unit. Computers that have DMA enabled channels can transfer data to and from devices much more quickly that computers that use more traditional Internet Protocol channels.

DMA technology has increasingly been incorporated into different high-speed transfer protocols and architectures. Examples of architectures that use DMA as a feature include VIRTUAL INTERFACE, and INFINIBAND. The DMA feature in such systems enables data in a memory on one device to specifically be targeted for memory on another external location, such as on another node or computer system. To gain full advantage of DMA, systems that incorporate DMA features generally do so with fast network connect devices.

DMA data transfers remove data bit overhead that is characteristic of the Transmission Control Protocol/Internet Protocol (TCP/IP) data transfers. TCP/IP protocol transfers use byte streams that are segmented, where each segment includes header information and other characteristics to enable that particular data segment to reach its intended target. In contrast, DMA transfers data in a memory segment without segmenting the data into individually deliverable bytes. While DMA provides a favorable contrast to TCP/IP, techniques also exist to use DMA with TCP/IP. One such technique is referred to as Remote DMA (RDMA) over TCP/IP.

Using DMA, a first machine may employ a first memory segment, or buffer, to send data to and receive data from a second buffer on a second machine. After the first buffer receives data from the second machine, the first machine reads the data from the first buffer. In response to reading the data from the first buffer, the first machine sends an acknowledgement to the second machine. This acknowledgement indicates to the second machine that the first machine has "consumed" the data in the first buffer, and therefore additional data can be sent from the second machine to the first buffer without fear of overwriting any data therein.

Unfortunately, sending acknowledgements to other machines requires time and resources of the sending machine. Additionally, it also requires time and resources for the recipient of the acknowledgements to process the acknowledgements. Thus, it is undesirably to send an acknowledgement message to another machine each time that a buffer is read. However, according to the current state of the art, these inefficiencies must be tolerated in order to prevent overwriting unconsumed data in a direct memory access buffer.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for performing a direct memory access operation is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

Techniques are provided to enable direct memory access (DMA) technology to be used effectively without having to send acknowledgements every time a machine consumes data in a DMA buffer. According to the techniques described herein, the use of acknowledge messages is reduced by (1) sending acknowledgements in batches, rather than every time the data in a buffer has been consumed, and (2) attempting to piggyback acknowledgements with other messages, to reduce the amount of additional traffic attributable to the acknowledge messages.

These techniques may be employed to facilitate data communications in any environment in which DMA is used. In one embodiment that shall be described herein, the techniques are implemented in a database system environment. The use of a DMA communication medium to perform database operations, particularly those involving the transfer of large amounts of data, enable the database operations to be performed significantly more quickly than through use of more traditional communication mediums, such as TCP/IP.

SYSTEM OVERVIEW

Figure 1:
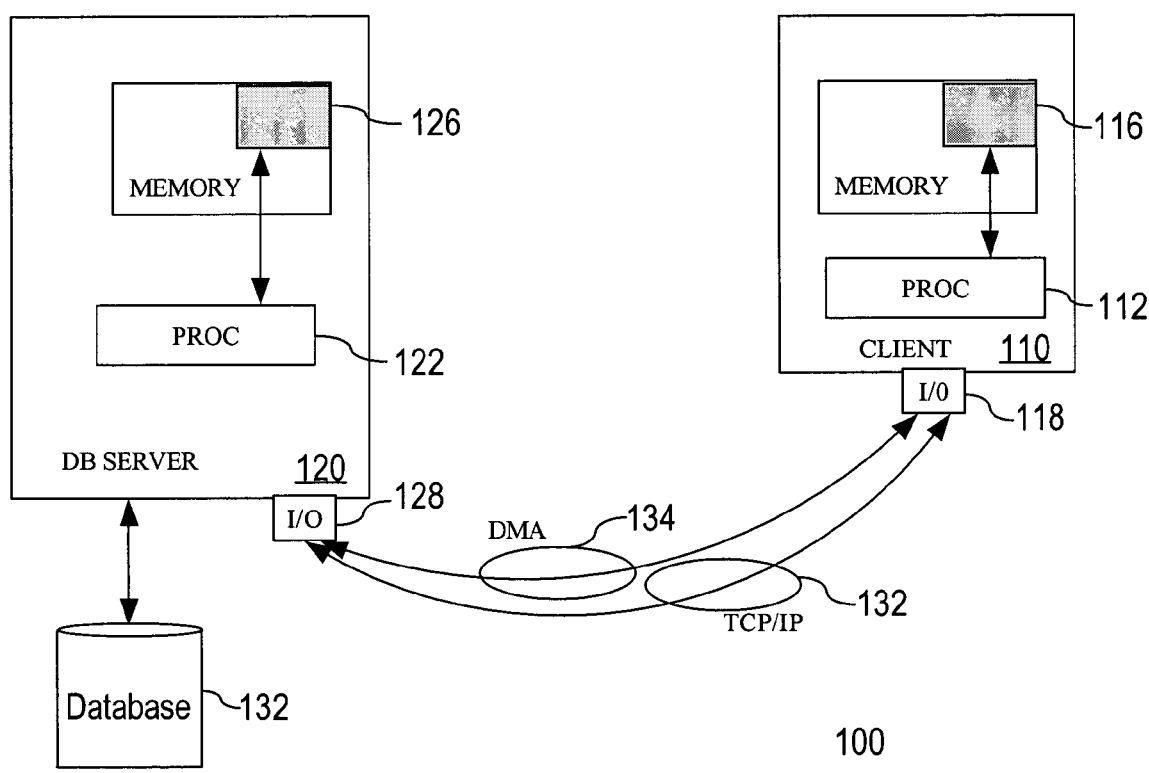
FIG. 1 illustrates a basic system for transferring data between two machines, under an embodiment of the invention.

FIG. 1 illustrates a basic system for transferring data between two machines, according to an embodiment of the invention. A system, such as the system illustrated in FIG. 1, enables two machines to transfer data using DMA transfer technology. Machines that are configured to exchange data with each other using DMA techniques are generally referred to herein as "DMA participants".

In the embodiment illustrated in FIG. 1, one of the DMA participants is a client 110 or workstation, and the other DMA participant is a database server machine 120 that manages a database 132. In other embodiments, client 110 may in fact be a second database server machine. For example, a database server component on client 110 may execute a client process that, in turn, communicates with database server machine 120.

Client 110 includes a central processing unit (CPU) 112, a memory 114, and an I/O port 118. Database server machine 120 includes a CPU 122, a memory 124, and an I/O port 128. The database 132 on database server machine 120 may be managed by a server component executed by CPU 122.

In one embodiment, client 110 and database server machine 120 may communicate through use of one of two or more channels. Specifically, FIG. 1 illustrates a TCP/IP channel 132 and a DMA channel 134 that interconnect the I/O port 118 of client 110 with the I/O port 128 of database server machine 120. The I/O ports 118 and 128 may each include components or features that are configured to communicate with other computers through DMA channel 134. The combination of I/O ports 118, 128 and a fast network connection between client 110 and database server machine 120 may form DMA channel 134. The I/O ports 118, 128 are configured to transfer data from and into allocated segments of memory on their respective machines without use of the CPUs 112, 122. The I/O ports 118, 128 are also configured to communicate with other computers through the use of TCP/IP channel 132 or DMA channel 134. As will be described, embodiments of the invention permit the use of the TCP/IP channel 132 in the event the DMA channel 134 is not available, or becomes disrupted.

INITIAL HANDSHAKING TO SET UP DMA

In order for the DMA channel 134 to be used, the client allocates a first memory segment 116 of memory 114 for exchanging data with the database server machine 120. Similarly, the database server machine 120 allocates a second memory segment 126 for exchanging data with the client 110. A memory segment used by a DMA participant to exchange data with another DMA participant is generally referred to herein as a "DMA memory segment".

The DMA channel 134 may be provided on a different physical component than the TCP/IP channel 132. For example, the DMA channel 134 may include an INFINI-BAND connection between client 110 and database server machine 120, while the TCP/IP channel 132 is provided on a traditional network connection, such as an ETHERNET connection. In another embodiment, the DMA channel is provided on the same physical components as the TCP/IP channel 132. Thus, one medium may be capable of use as either a DMA channel or a TCP/IP channel.

In an embodiment, the client 110 and database server machine 120 must determine whether the DMA channel 134 can be used to transfer data with each other. If DMA channel 134 cannot be used to transfer data between client 110 and database server machine 120, then the TCP/IP channel 132 is used. Preliminary communications to establish DMA channel 134, and to determine whether DMA channel 134 can be used, are conducted over the TCP/IP channel 132.

In one embodiment, client 110 signals a remote procedure call (RPC) to database server machine 120. The CPU 122 of database server machine 120 recognizes that the DMA channel 134 may be available for subsequent communications identified by the RPC. For example, channel 134 may be available for subsequent RPC communications once a viable DMA Channel has been established. The database server machine 120 signals a return to the RPC through the TCP/IP channel 132, indicating that DMA channel 134 should be used.

In response to receiving the RPC response from the server machine 120, the CPU 112 of the client 110 allocates a client-side DMA segment 116 of memory 114 to be used to exchange data with the database server machine 120. Similarly, the CPU 122 of the database server machine 120 allocates a server-side DMA segment 126 of memory 124 for exchanging data with the client 110. The client 110 sends a bid, which is an identifier for client-side DMA segment 116, to the database server machine 120. Similarly, the database server machine 120 sends a bid containing an identifier for server-side DMA segment 126 to the client 110.

Once DMA memory segments are allocated on client 110 and database server machine 120, an embodiment provides that one or both client 110 and database server 120 perform a verification. The verification is to determine whether the DMA channel is available for data transfer between the two machines. The verification performed on one or both machines may be performed through a verification techniques such as will be later described with reference to FIG. 4.

EXCHANGING DATA USING DMA

Once established, the DMA channel 134 may be used to perform database operations between client 110 and database server machine 120. Once the DMA channel 134 is established between client 110 and database server machine 120, operations for writing and reading data from one machine to the other machine may be executed by the transferor of the data executing a write operation to its memory segment allocated for the other machine. Both client 110 and database server machine 120 may read from and write to its allocated local memory. DMA Channel 134 transfers the data from local memory to the other machine only after an explicit request to do so, e.g., an explicit send request.

For either read or write type operations, if the machines are determined to not be able to communicate over DMA channel 134, then TCP/IP channel 132 will be used. While TCP/IP channel 132 is slower, use of that channel as a backup ensures that the database operations can be performed.

USING DMA TO PERFORM WRITE OPERATIONS

Figure 2:
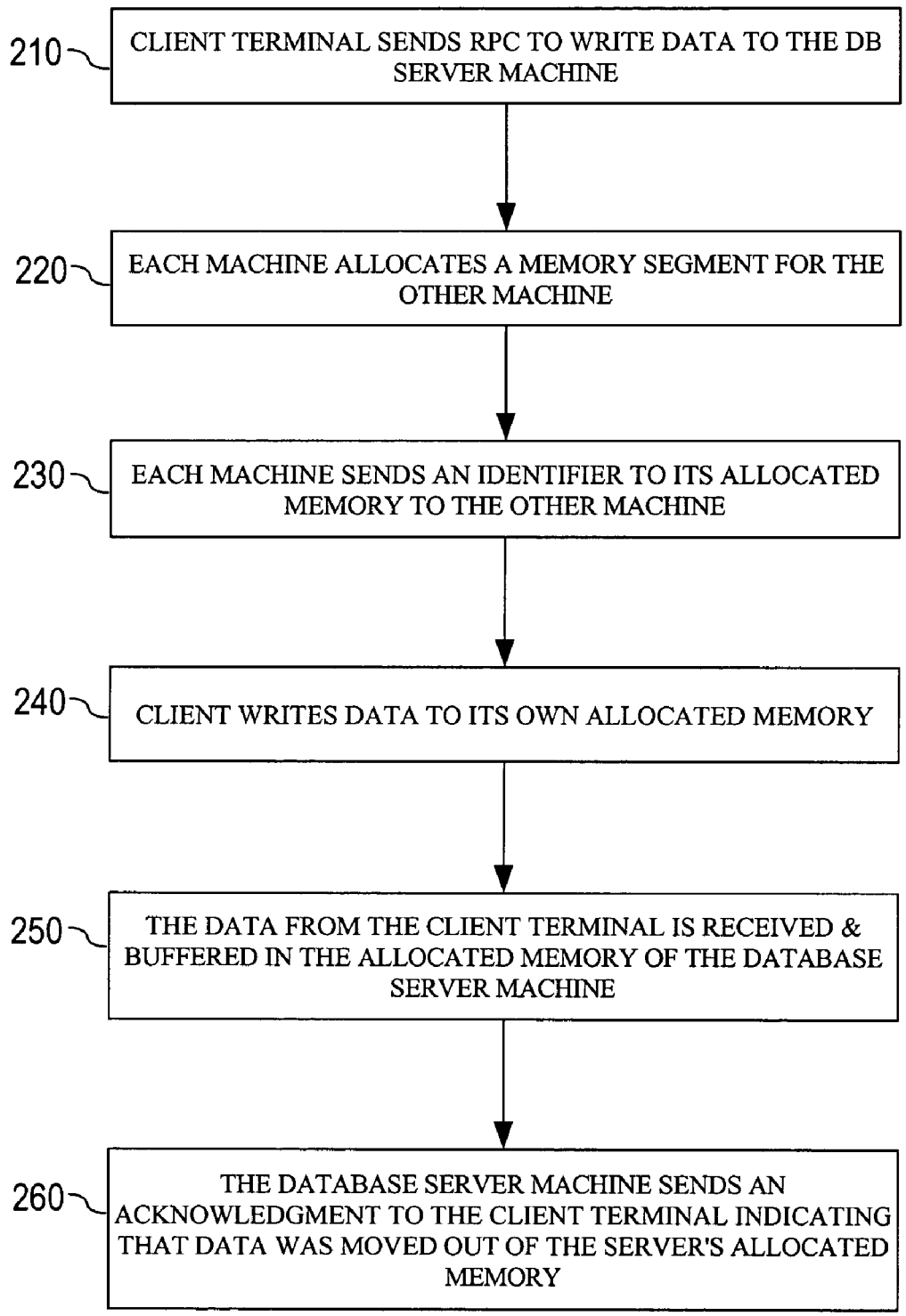
FIG. 2 illustrates a method for implementing write operations between two machines using DMA data transfer, under an embodiment of the invention.
Figure 3:
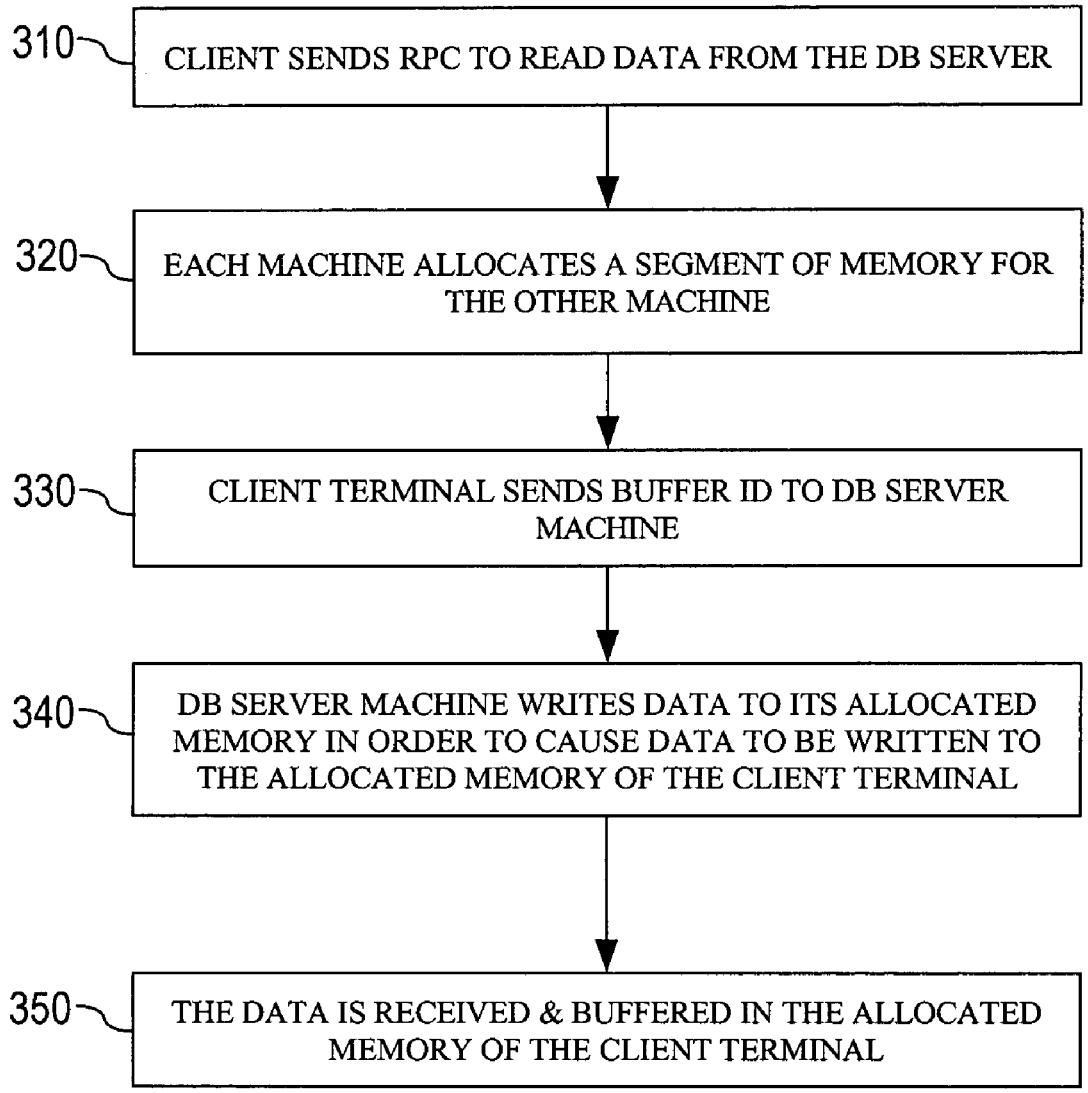
FIG. 3 illustrates a method for implementing read operations between two machines using DMA data transfer, under an embodiment of the invention.

FIG. 2 and FIG. 3 illustrate methods for transferring data between two machines for the purpose of performing database operations. The references to elements of FIG. 1 are made for purpose of providing exemplary components for performing the steps of the methods, as described herein.

FIG. 2 illustrates a flowchart of a method for implementing write operations between two machines using DMA data transfer, under an embodiment of the invention. For illustrative purposes, an embodiment is described where client 110 writes data to database server machine 120. For example, client 110 may initiate an INSERT operation to transfer a large amount of data, formatted as rows, to the database 132 on database server machine 120.

In step 210, client 110 sends an RPC to database server machine 120, indicating that client 110 is seeking to write data to the database server machine 120. The RPC may indicate that an INSERT or other write operation is to be performed in order to transfer data to database server machine 120 from client 110. The data may be destined for database 132, or forwarded to other clients and/or database servers. In either case, the database server machine 120 sends a return to the client 110 in response to the remote procedure call being made. Both the remote procedure call and its return are sent through TCP/IP channel 132.

After sending the RPC, at step 220 each machine allocates a memory segment for the other machine. Thus, client 110 allocates client-side DMA segment 116 for exchanging data with database server machine 120. The database server machine 120 allocates server-side DMA segment 126 for exchanging data with client 110.

At step 230, each machine sends identifiers for its allocated memory to the other machine. Such identifiers may be referred to as "bids". The bids contain addresses to the allocated memory on each machine. Thus, client 110 sends a bid to database server machine 120 containing the address to client-side DMA segment 116. Likewise, database server machine 120 sends client 110 the bid containing the address to server-side DMA segment 126. In one embodiment, the bids are also exchanged between client 110 and database server machine 120 through the TCP/IP channel 132.

In order to write data from client 110 to database server machine 120, step 240 provides that client 110 writes the data that is to be transferred to client-side DMA segment 116. The I/O port 118 of client 110 automatically moves the data out of the client-side DMA segment 116 and to database server machine 120, where it is received by the I/O port 128. The data is transferred from client 110 to database server machine 120 using DMA channel 134.

In step 250, data received by database server machine 120 from client 110 is buffered in server-side DMA segment 126. This may be accomplished by the I/O port 128 of database server machine 120 moving the data received from the I/O port 118 into server-side DMA segment 126. The CPU 122 of database server machine 120 then reads the data into the database.

In step 260, the database server machine 120 sends an acknowledgement to client 110 upon the data being moved out of server-side DMA segment 126. For example, CPU 122 may read data from server-side DMA segment 126 and move the data into database 132, or make the data available to other database servers and clients. Once server-side DMA segment 126 has been completely consumed by the database server machine 120, the acknowledgement can be made to client 110 so that additional data can be written from client 110 to database server machine 120. In an embodiment, both client 110 and database server machine 120 make acknowledgements when the respective client-side DMA segment 116 and server-side DMA segment 126 have been fully consumed.

The acknowledgement may be a relatively short message, such as a few bytes long. Thus, it can be sent over either TCP/IP channel 132 or DMA channel 134. However, once DMA channel 134 is open, it may be easier to send the acknowledgement using the DMA channel 134. Given the small size of the acknowledgement, and the fact that data transmitted over DMA channel 134 contains little overhead (such as in the form of headers), it is also relatively easy to package the acknowledgement with some other message sent from database server machine 120 to client 110. The acknowledgement transmitted in step 260 may be either an explicit acknowledgement or an implicit acknowledgement. The process of transmitting an acknowledgement is described in further detail in the section entitled "Sending Acknowledgement Messages."

USING DMA TO PERFORM READ OPERATIONS

FIG. 3 illustrates a method for implementing read operations between two machines using DMA data transfer, under an embodiment of the invention. For the purpose of illustration, FIG. 3 is described with the read operations being performed by client 110, where the data that client 110 desires to read resides at database server machine 120. As an example, an UPDATE or SELECT operation may be performed by client 110 to view data in database 132. The speed in which such operations are performed may be facilitated through the use of DMA channel 134.

In step 310, client 110 sends a remote procedure call to read data from database server machine 120. The remote procedure call may contain or indicate the UPDATE, SELECT or other read operation. A return of the remote procedure call may be made by database server machine 120. Both the remote procedure call and its return are sent through TCP/IP channel 132.

In step 320, each machine allocates a segment of memory for the other machine. For the purpose of explanation, it shall be assumed that client 110 allocates client-side DMA segment 116 for exchanging data with database server machine 120, and that database server machine 120 allocates server-side DMA segment 126 for exchanging data with client 110.

At step 330, client 110 sends a bid to database server machine 120 containing the address to client-side DMA segment 116. In an embodiment, database server machine 120 may also send client 110 a bid to the second segment of memory 126 for return communications form client 110. The bids may also be exchanged using the TCP/IP channel 132.

In order to perform the read operation, at step 340 database server machine 120 writes data to the server-side DMA segment 126 in order to cause data to be written to client-side DMA segment 116 on client 110. Upon database server machine 120 writing the data to server-side DMA segment 126, I/O port 128 of database server machine 120 moves the data being buffered in server-side DMA segment 126 across DMA channel 134 to the client 110.

In step 350, the data is received and buffered in the client-side DMA segment 116 of client 110. The I/O port 118 of client 110 moves the data into client-side DMA segment 116. The CPU 112 on client 110 then reads the data requested by the read operation from client-side DMA segment 116.

VALIDATING DMA COMMUNICATIONS

If either of the write or read operations described with FIG. 2 and FIG. 3 are not available between client 110 and database server machine 120, then client 110 and database server machine 120 may transfer data for performing the database operations using a TCP/IP channel 132. The use of TCP/IP channel instead of DMA channel 134 provides a reliable backup in the event DMA configurations of client 110 and database server machine 120 are incompatible, or not possible for any reason.

Figure 4:
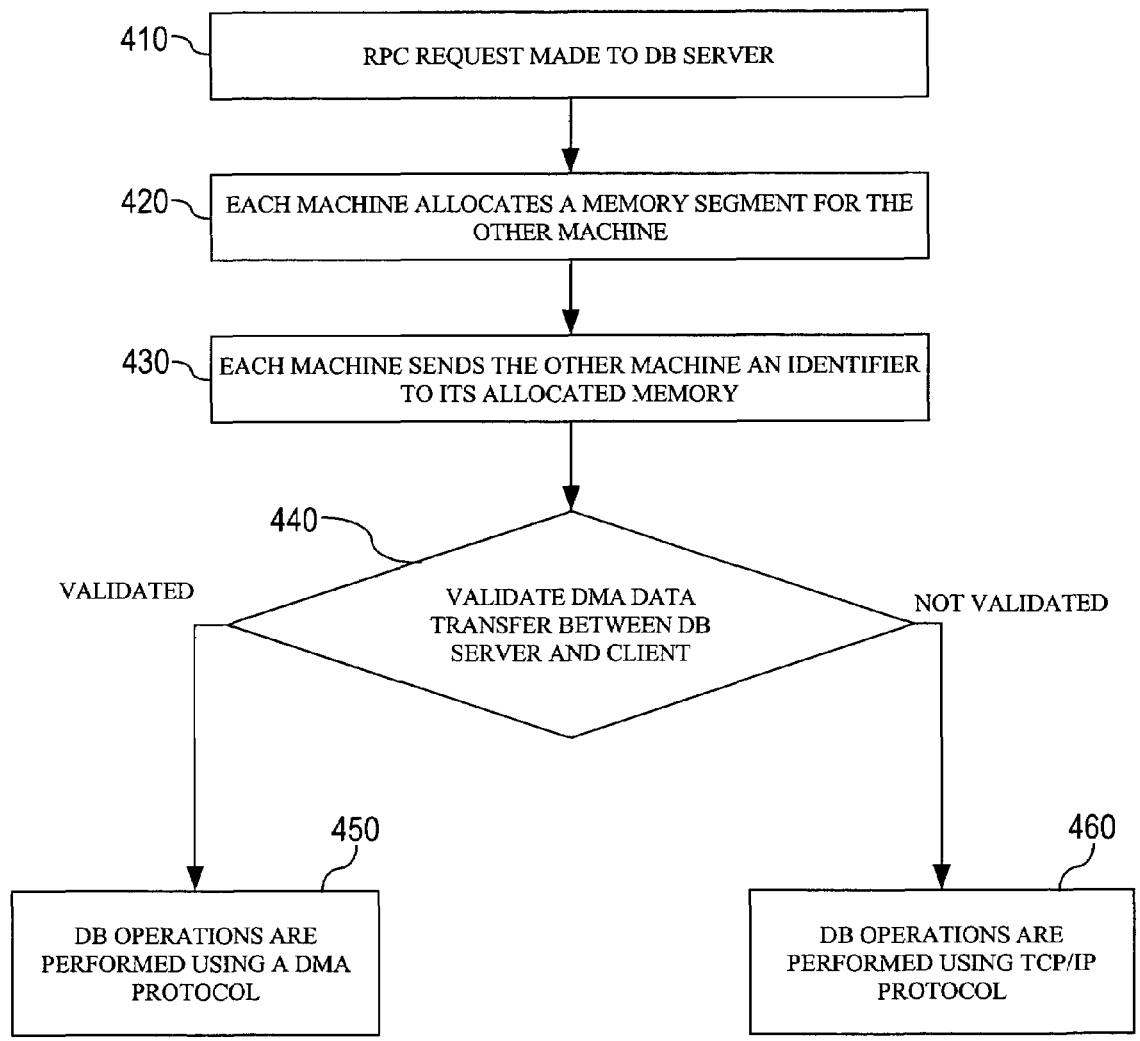
FIG. 4 illustrates a method for validating the ability of two machines to exchange data for database operations using DMA data transfer.

FIG. 4 is a flowchart of a method for validating the ability of two machines to exchange data for database operations using DMA data transfer, under an embodiment of the invention. A method, such as described with FIG. 4, may be used in conjunction with transferring data between machines for purpose of performing either write or read operations. Thus, a method such as described with FIG. 4 may be implemented as additional steps to methods described in FIGS. 2 and 3.

In step 410, a first machine sends another machine an RPC to perform some database operation. As stated, the remote procedure call may specify either write or read operations that are to be performed. The other machine may send a return to the RPC. Both the RPC and its return are sent through a TCP/IP channel.

At step 420, each machine allocates a memory segment for the other machine. As described previously, the allocated memory one each machine provides a temporary buffer for data that is to be transferred amongst the machines.

In step 430, each machine sends the other machine an identifier, or bid, to its allocated memory. The identifier provides an address for one machine to write data to the other machine. The identifiers may be exchanged across a TCP/IP connection.

In step 440, it is determined whether a DMA data transfer can be performed between the two machines. For example, it is possible that the two machines are each DMA enabled, but one machine uses different equipment, software and/or protocol, making the two machines incompatible with one another for purpose of performing DMA data transfers.

Several techniques are possible for making the verification determination. One technique provides that each machine attempts to write data, in the form of a test message, to the other machine using the allocated memories. For example, one machine may write the other machine a test message through its allocated memory, and await for an acknowledgement from the other machine that the data was received, buffered, and/or used by the second machine through the other machine's allocated memory. In one embodiment, only the machine that is to write data to the other machine needs to send the test message. In another embodiment, both machine send each other test messages, and await acknowledgments from the other machine. Both the test message and acknowledgement may be communicated over DMA channel 134.

Another validation technique involves comparing each machine's software to determine whether the machines are compatible for DMA transfer. For example, one machine may send the other machine a message containing its software information, and the other machine may perform the comparison to determine compatibility. In an embodiment, the compatibility information used for performing the verification may be send over a TCP/IP channel. It is possible for the compatibility information to be provided with the remote procedure call and its return. Such a comparison step may be performed in addition to or instead of sending test messages through allocated memory.

If DMA compatibility is validated in step 440, then at step 450 database operations may be performed between the first machine and the second machine over a DMA connection. If DMA compatibility is not validated in step 440, then at step 460 database operations may be performed between the first machine and the second machine over a TCP/IP connection. For example, in FIG. 1, DMA channel 134 may be used if the validation is determined in step 440, else TCP/IP channel 132 is used.

USING MULTIPLE BUFFERS TO TRANSFER DATA

Figure 5:
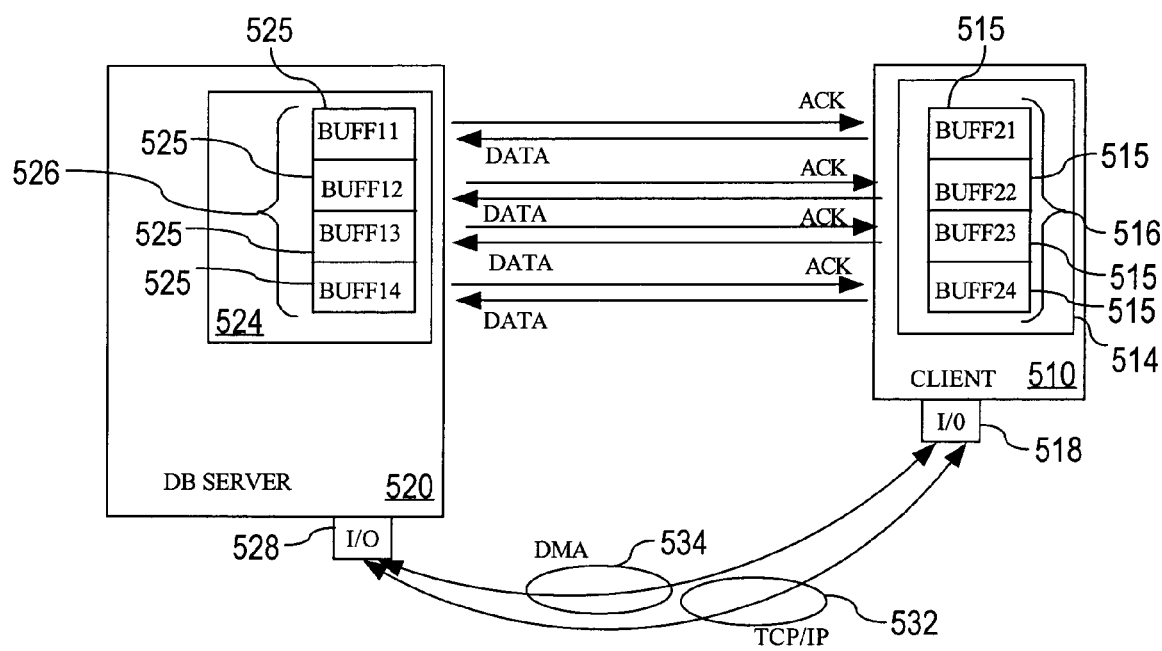
FIG. 5 illustrates a basic system for transferring data between two machines using multiple buffers, under an embodiment of the invention.

FIG. 5 illustrates a basic system for transferring data between two machines using multiple buffers, according to an embodiment of the invention. In FIG. 5, a client 510 communicates with a database server machine 520 to perform database operations, including operations to transfer data with read and/or write operations. The client 510 and database server machine 520 are assumed to be compatible across a DMA connection 534. A TCP/IP connection 532 may also interconnect the two machines, and be used to establish communications across the DMA channel 534. The database server machine 520 manages a database that is not shown in FIG. 5.

The client 510 has a memory 516, a portion of which may be allocated as a DMA segment for use in exchanging data with database server machine 520. Likewise, database server machine 520 has a memory 524, a portion of which may be allocated as a DMA segment for use in exchanging data with to client 510. The database server machine 520 also manages a database 532. Communications to and from client 510 may be made through an I/O port 518. Communications to and from database server machine 520 may be made through an I/O port 528.

Upon one of the machines signaling an RPC to the other machine across the TCP/IP connection 532, each machine allocates a portion of its memory for use in DMA operation with the other machine. The client 510 allocates a client-side segment 516 from its memory 514. The database server machine 520 allocates a server-side segment 526 from its memory 524.

According to an embodiment, the allocated DMA segments on each machine may be divided into a plurality of buffers. On client 510, client-side segment 516 is divided into a first plurality of buffers 515. On database server machine 520, the server-side segment 526 is divided into a second plurality of buffers 525. The relationship between the buffers is that each one of the first plurality of buffers 515 corresponds to one of the second plurality of buffers 525. Thus, if data is written to one of the buffers on either client 510 or database server machine 520, that data is, upon execution of a designated command, automatically written to the corresponding buffer on the other machine. Alternatively, the designated command may be initiated by a prompt from the user, which causes the data to be transferred over the DMA channel 435.

In FIG. 5, the correspondence amongst buffers 515, 525 is illustrated by numbering, where BUFF11 corresponds to BUFF21 and BUFF14 corresponds to BUFF24. The correspondence amongst buffers may be established using the TCP/IP channel 532. For example, the correspondence may be established with the RPC 1 to initiate database operations between client 510 and database server machine 520.

Dividing allocated memory into buffers increases the speed by which data can be moved from client 510 to database server machine 520. If no division is used on the allocated memory, then all data held in client-side segment 516 would have to be transferred to server-side segment 526 before additional data can be exchanged between client 510 and database server machine 520. Therefore, if client-side segment 516 is only 4 k in size, and a user of client 510 wishes to write 8 k of data to database server machine 520, then the data would have to be written locally to client-side segment 516 at least twice. First, 4 k of the data would have to be written to client-side segment 516, and once I/O port 518 moves that data to database server machine 520, the next 4 k of data may be written to the client-side segment 516. Even if client-side segment 516 is large enough to accommodate 8 k of data, the 8 k of data would still have to be moved as one chunk, so that some of the data would arrive later than other data.

In contrast, an embodiment such as described in FIG. 5 enables both 4 k segments of data to be transferred from client-side segment 516 concurrently, to enhance the overall delivery time for data to be delivered from client 510 to database server machine 520. The use of buffers reduces the size of the data chunks being sent, so that all the data stored in each buffer 515 can be transferred to corresponding buffers 525 in less time than if the same amount of data was transferred from client-side segment 516 to second memory segment 516 as a single block of data.

The manner in which client 510 and database server machine 520 may exchange data during performance of database operations is as follows. One machine, the transferor, writes data to its allocated memory, and that data is distributed amongst the buffers. The data is then transported to corresponding buffers on the recipient machine. Once data stored in each buffer on the recipient machine is used, the recipient machine sends the transferor machine an acknowledgement. In an embodiment, the acknowledgement signifies that a buffer on the recipient machine has been completely consumed. Thus, an acknowledgement may be, although it need not be, sent for each buffer on the recipient machine. Upon receiving the acknowledgement, the transferor machine knows that it can write more data to the buffer corresponding to the recipient machine's buffer from the acknowledgement was received. In an embodiment where asynchronous data transfer is possible, data may be queued in the allocated memory of the machine performing the write operation until buffers become available. The process of transmitting acknowledgements is described in further detail in the section entitled "Sending Acknowledgement Messages."

If, as shown by FIG. 5, client 510 is writing data to database server machine 520, then client 510 writes that data locally to client-side segment 516. The data in client-side segment 516 would be distributed to the buffers 515. The I/O port 518 of client 510 moves data from buffers 515 to database server machine 520. The I/O port 528 of database server machine 520 moves the data into buffers 525. In this way, data in one of the buffers 515 of client 510 is moved to its corresponding buffer 525 on database server machine 520.

In an embodiment, when database server machine 520 uses all of the data being held in one of the buffers 515, the database server machine 520 sends an acknowledgement to the client 510. The client 510 then can place more data into the specific buffer 515 corresponding to the buffer 525 from which the acknowledgement was provided. An acknowledgement may be received from each of the buffers 515. In embodiments where asynchronous data transfer is enabled, client 510 may queue data waiting to be transferred to database server machine 520 until one of the buffers 515 has a corresponding buffer on database server machine 520 that has been acknowledged as being empty. The process of transmitting acknowledgements is described in further detail in the section entitled "Sending Acknowledgement Messages."

If, for example, client 510 is performing a read operation for data in the database managed by the database server machine, then the data identified for transfer to client 510 is moved into server-side segment 526. The data may be distributed amongst buffers 515, and carried over to client 510 through I/O port 528. The data may then be held on client 510 in buffers 515. The client 510 then reads data from buffers 515. Once one of the buffers 515 becomes available, client 510 sends an acknowledgement to database server machine 520 indicating that the buffer is empty.

SYNCHRONOUS AND ASYNCHRONOUS DATA TRANSFERS

In a system such as shown by FIG. 5, data may be transferred either synchronously or asynchronously. In a synchronous transfer, the sender waits until the transfer completes before transmitting data, while in an asynchronous transfer the sender may transmit data irrespective of receiving data. In a synchronous data transfer, if the data being written locally to allocated memory for another machine exceeds the size of the allocated memory, then the processor of the machine writing the data remains active to monitor the allocated memory and write additional data to the allocated memory as it becomes available. The data is transferred from the transferor machine as the data is synchronously written to the allocated memory.

Asynchronous transfer may be implemented in some embodiments by writing data locally on the transferor machine to a queue. The queue causes the data to be written to the buffers as the buffers become available. Active involvement of the processor on the machine writing the data locally is not needed to monitor and write the data to the queue. Rather, all the data that needs to be transferred through the allocated memory is sent once to the queue, and the queue holds the data for the allocated memory (or its individual buffers) until additional data can be distributed within the allocated memory.

SENDING ACKNOWLEDGEMENT MESSAGES

An acknowledgement message need not be transmitted each time data is stored in a buffer on the recipient machine. In other words, while an acknowledgement message may be sent when data is entirely consumed from a buffer on the recipient machine, the acknowledgement message does not necessarily need to be sent immediately. Efficiencies may be realized by acknowledging that multiple buffers have been read in the same acknowledgement message. Further, by delaying the transmission of an acknowledgement message, the number of buffers acknowledged in that acknowledge message may be increased, thereby increasing the efficiency of the system by reducing the number of individual acknowledgement messages that are sent.

An acknowledgement message may be sent by either sending a separate message, whose purpose is to transmit an acknowledgement message (hereinafter an "explicit" acknowledgment), or by piggybacking the acknowledgement information within another message (hereinafter an "implicit" acknowledgement). For example, the acknowledgement messages depicted and described in FIG. 5 are explicit messages because the acknowledgement data was sent in a separate message whose sole purpose was to transmit an acknowledgement message. On the other hand, implicit acknowledgement messages may "piggyback" the acknowledgement information in a pre-existing write request. Further efficiencies may be realized by increasing the likelihood that a buffer will be acknowledged by an implicit acknowledgement message because, unlike an explicit acknowledgement message, an implicit acknowledgement message may be included (piggybacked) on another message and does not require a separate message to be created and sent.

An implicit acknowledgement message may be transmitted by including the acknowledgement information in a specified area of the message, e.g., the control portion of the message, in which the recipient reviews for incoming implicit acknowledgement messages.

Figure 6A:
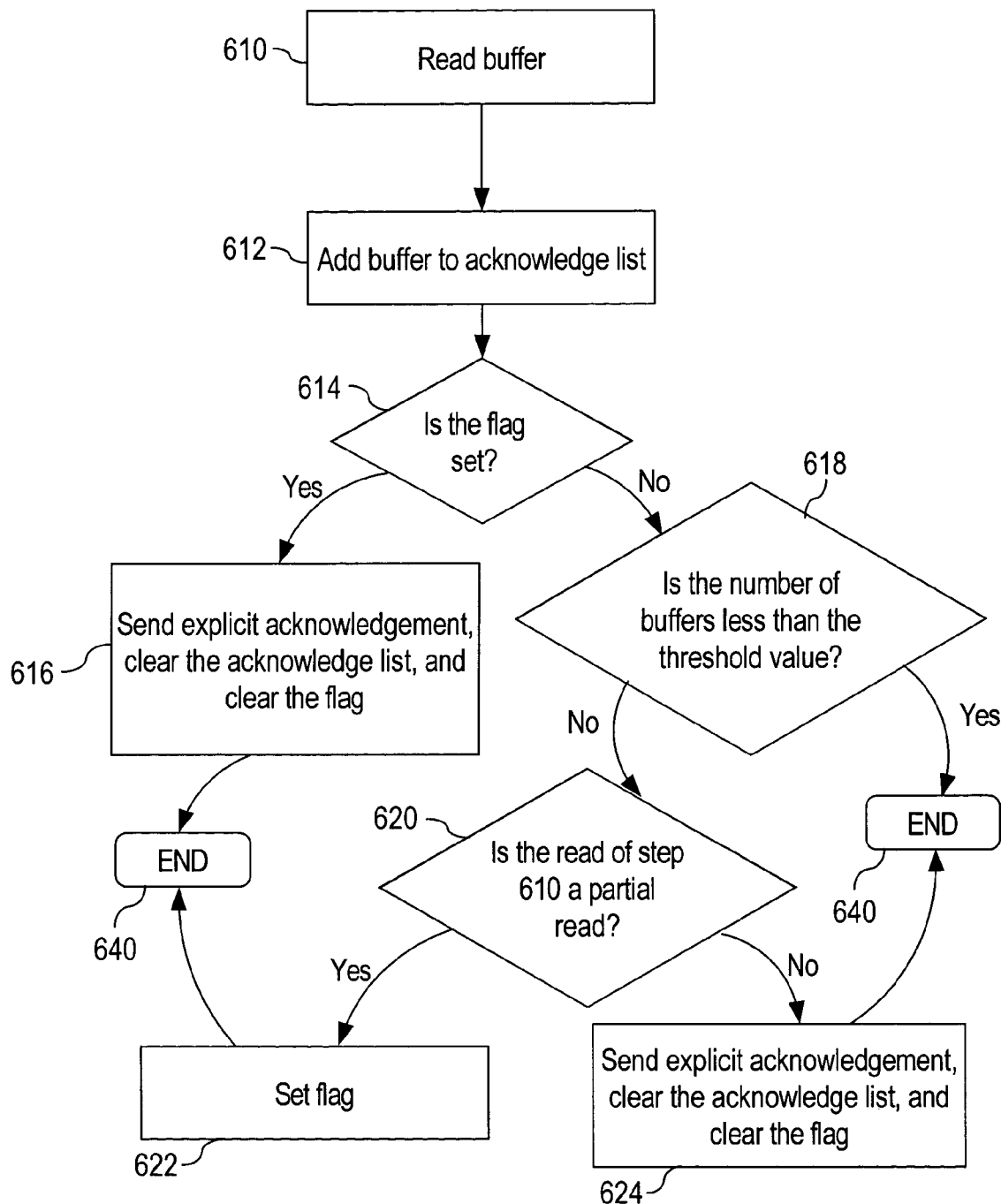
FIG. 6A is a flow-chart that illustrates the steps of sending an explicit acknowledgement according to an embodiment of the invention.

FIG. 6A is a flowchart that illustrates the steps of sending an explicit acknowledgement message according to an embodiment of the invention. While embodiments of the invention may be implemented using any number of machines, to facilitate the ease of explanation, examples in the following description of FIG. 6A shall refer to a first machine and a second machine, wherein the first machine (the "reader") is reading a buffer in which the second machine ("the writer") wrote data using direct memory access. In step 610, data is read from a particular buffer. The buffer being read resides upon the reader. Thereafter, in step 612, the particular buffer from which data was read in step 610 is added to a list of buffers that need to be acknowledged. For example, if the reader reads buffer X in step 610, then the reader adds buffer X to the list of buffers that need to be acknowledged. No acknowledgement message, either explicit or implicit, is transmitted to the other machine (the writer) in response to the data being read from the buffer.

In step 614, a determination is made as to whether a flag is set. The flag is a prediction of whether the first machine will transmit an implicit acknowledgement to the second machine that the data has been read from the first buffer. The flag may be expressed using a variety of mechanisms. For example, the flag may be expressed as a variety of variable types, e.g., a BOOLEAN variable or a checkbox variable. The flag is only set in step 622; consequently if processing has not performed step 622, then the flag cannot be set. Note that the flag may be cleared in other processing steps, e.g., 616 and 624. If the determination of step 614 is positive, then processing proceeds to step 616. If the determination of step 614 is negative, then processing proceeds to step 618.

In step 616, an explicit acknowledgement message is transmitted to the machine that wrote data in the buffer using direct memory access that was read in step 610. For example, if the reader reads a buffer in which a writer wrote in data, and the flag was set when processing was performing step 614, then the reader would send an explicit acknowledgement message in step 616. Also in step 616, the list of buffers that need to be acknowledged is cleared, because the explicit acknowledgement transmitted in this step acknowledges all the buffers that were on the list. Said differently, the explicit acknowledgement message transmitted in step 616 acknowledges any and all buffers that have not been previously acknowledged as being read. Additionally, in step 616, the flag is cleared. After step 616, processing ends at step 640.

In step 618, a determination is made as to whether the number of buffers in the list of buffers that need to be acknowledged is less than the threshold value. The threshold value is the number of buffers that may be on the list of buffers that need to be acknowledged before an explicit acknowledgment should be sent. In an embodiment, the threshold value is equal to half the number of buffers at a machine. For example, if a particular machine has 32 buffers, then the threshold value will be 16. In other embodiments, the threshold value is initially obtained by determining the value of half the number of buffers on a machine, but is subsequently modified to reflect the network dynamics of the system to optimally arrive at a threshold value that results in the yield of greatest efficiency. In such an embodiment, the threshold value may be monitored and adjusted, if need be, to minimize the risk of running out of unacknowledged buffers while maximizing the efficiencies of the process depicted in FIG. 6A. If the number of buffers in the list of buffers that need to be acknowledged is less than than the threshold value, then processing proceeds to step 640. If the number of buffers in the list of buffers that need to be acknowledged equal to or greater than the threshold value, then processing proceeds to step 620.

In step 620, a determination is made as to whether the read performed in step 610 was a partial read. A partial read of a buffer is any read of a buffer in which the data read is less than the capacity of the buffer. For example, if a buffer has a capacity of 1,000 bytes, then if the amount of data read in step 610 was 500 bytes, then the buffer is considered to be partially read. In some implementations of direct memory access, the entire capacity of the buffer is always written, while only a portion of the buffer may be considered to be useful, i.e., contain data intended to be utilized by the recipient. Thus, in those implementations where the full capacity of the buffer is used when the information intended to be utilized by the recipient is less than the full capacity of the buffer, then for purposes of determining a partial read step 620 shall only consider the data intended to be utilized by the recipient. If the determination of step 620 is positive, then processing proceeds to step 622. If the determination of step 620 is negative, then processing proceeds to step 624.

In step 622, the flag is set. The flag may be set by a variety of mechanisms, e.g., if the flag is a BOOLEAN value, then the flag may be set by assigning a value of TRUE to the flag, or if the flag is a checkbox, then the flag may be set by checking the checkbox. When the flag is set, it is predicted that the machine that read in the buffer will transmit an implicit acknowledgement to the machine that wrote the data using direct memory access in the buffer that was read because the most recent read was a partial read, which suggests that the other machine has finished writing a unit of associated data. As the other machine (the writer) was presumably finished writing a unit of associated data, it allows the reader to respond by transmitting a message to the writer (for example, a write message), which may hold an implicit acknowledgement. After step 622 has been performed, processing ends at step 640.

If the determination of step 620 is negative, i.e., the most recent read was not a partial read, then processing proceeds to step 624. In step 624, an explicit acknowledgement message is transmitted to the machine that wrote data in the buffer that was read in step 610. For example, if the reader read a buffer in which a writer wrote in data, the reader would send an explicit acknowledgement message in step 624. An explicit acknowledgement message is necessary to ensure that the writer does not run out of buffers, and it is not likely that the reader will be able to transmit an implicit acknowledgement message before the writer runs low on available buffers. Also in step 624, the list of buffers that need to be acknowledged is cleared, because the explicit acknowledgement transmitted in this step acknowledges all the buffers that were on the list. Additionally, in step 620, the flag is cleared. After step 624 has been performed, processing ends at step 640.

The steps depicted in FIG. 6A may be repeated each time a machine reads data from a buffer. The particular sequence of steps illustrated in FIG. 6A are merely illustrative of a particular embodiment; other embodiments may perform the same or similar steps in a different or parallel order. For example, other embodiments of the invention may perform steps 610 and 612 in parallel. Consequently, embodiments of the invention are not limited to the exact sequence of steps illustrated in FIG. 6A.

Figure 6B:
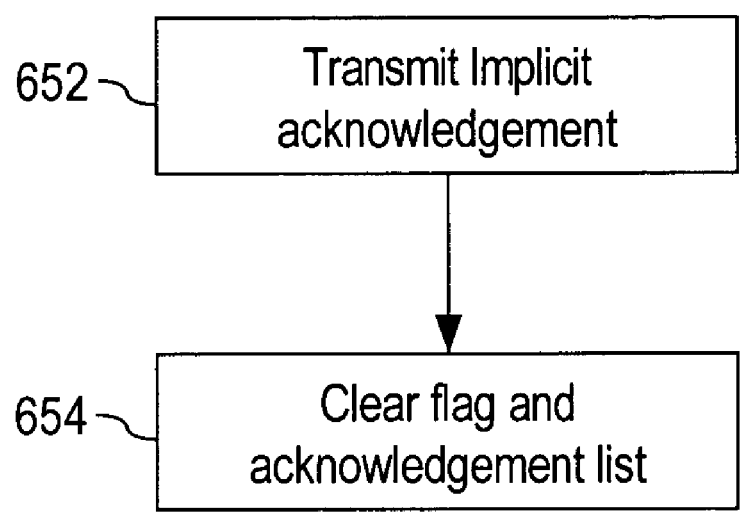
FIG. 6B is a flow-chart that illustrates the steps of sending an implicit acknowledgement according to an embodiment of the invention.

FIG. 6B is a flow-chart that illustrates the steps of sending an implicit acknowledgement according to an embodiment of the invention. In step 652, an implicit acknowledgement message is transmitted from the reader of a buffer to the machine that wrote the data in the buffer that was read. The implicit acknowledgement may acknowledge that multiple buffers have been read. Step 652 may be performed whenever a message (for example, a write message) is being sent from one machine to another. The transmittal of an implicit acknowledgement message does not require the transmittal of an additional message, so overhead in sending an implicit acknowledgement message is minimized.

After the implicit acknowledgement message is transmitted in step 652, the flag is cleared in step 654. Also in step 654, the list of buffers that need to be acknowledged is cleared, because the implicit acknowledgement transmitted in step 652 acknowledges all the buffers that were on the list. After the performance of step 654, processing ends.

The steps depicted in FIG. 6B may be repeated each time a machine reads data from a buffer. The particular sequence of steps illustrated in FIG. 6B are merely illustrative of a particular embodiment; other embodiments may perform the same or similar steps in a different or parallel order. For example, other embodiments of the invention may perform steps 652 and 654 in a different order or in parallel. Consequently, embodiments of the invention are not limited to the exact sequence of steps illustrated in FIG. 6B.

HARDWARE OVERVIEW

Figure 7:
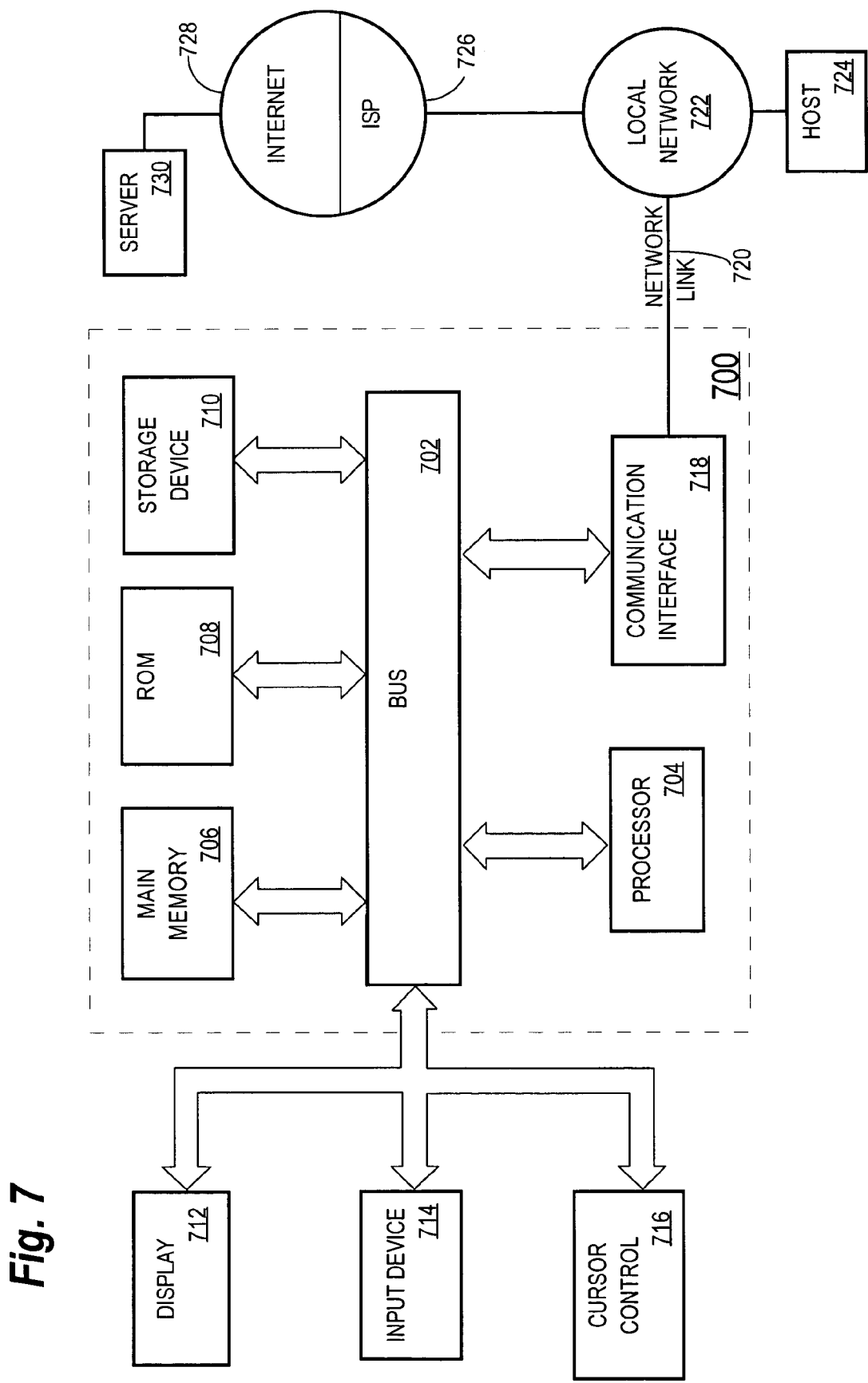
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising performing a machine-executed operation involving instructions, wherein the machine-executed operation is at least one of:
   A) sending said instructions over transmission media;
   B) receiving said instructions over transmission media;
   C) storing said instructions onto a machine-readable storage medium; and
   D) executing the instructions;
   wherein said instructions are instructions which, when executed by one or more processors, causes:
      performing a read operation to read data from a first buffer that has a particular capacity, wherein the data was written into the first buffer by a DMA mechanism in response to the data being written into a second buffer at a second machine;
      based on a set of one or more factors, determining whether to respond to performance of said read operation by transmitting, to the second machine, an acknowledgement that the data was read from the first buffer;
      wherein said set of one or more factors includes at least one of:
         whether the read operation was a partial read in which less data was read than the particular capacity of said first buffer;
         whether acknowledgements have not yet been sent for more than a threshold number of previously read buffers, and
         whether an amount of unacknowledged data received by the first machine from the second machine exceeds a threshold quantity.

2. The method of claim 1, wherein execution of the instructions by the one or more processors further causes:
   after determining that the data represents a partial read, refraining from sending an explicit acknowledgement in response to said read operation in order to see if an implicit acknowledgment can be sent before a subsequent read operation.

3. The method of claim 2, wherein execution of the instructions by the one or more processors further causes:
   sending the implicit acknowledgement to the second machine, wherein the implicit acknowledgement acknowledges that the data was read from the first buffer by the first machine, wherein the step of sending the implicit acknowledgement includes piggybacking acknowledgement information to a message that is being sent from said first machine to said second machine.

4. The method of claim 2, wherein the data read from the first buffer is a first set of data, and wherein execution of the instructions by the one or more processors further causes:
   if the implicit acknowledgement has not been sent before said subsequent read operation, then sending the explicit acknowledgement in response to said subsequent read operation.

5. The method of claim 4, wherein the subsequent read operation reads a second set of data, and wherein
   the explicit acknowledgement acknowledges that the first machine has read both the first set of data and the second set of data.

6. The method of claim 1, wherein execution of the instructions by the one or more processors further causes:
   if acknowledgements have not yet been sent for more than the threshold number of previously read buffers, and the read operation was a partial read, then responding to said read operation by sending an explicit acknowledgement to the second machine, wherein said explicit acknowledgement acknowledges that said previously read buffers, for which acknowledgements had not yet been sent, have been read by said first machine.

7. The method of claim 1, wherein the threshold number is equal to half the number of buffers at the first machine that have been allocated for DMA operations with said second machine.

8. The method of claim 1, wherein execution of the instructions by the one or more processors further causes:
   if the amount of unacknowledged data received by the first machine from the second machine does not exceed the threshold quantity, then determining that no acknowledgement is to be sent in response to the data being read from the first buffer.

9. The method of claim 1, wherein execution of the instructions by the one or more processors further causes:
   determining if a factor, of the set of one or more factors, is satisfied; and
   if the factor is satisfied, then sending a single acknowledgement message that acknowledges that the first machine has performed a plurality of read operations on a plurality of buffers that are being used to exchange data between the first machine and the second machine.

10. The method of claim 1, wherein execution of the instructions by the one or more processors further causes:

if the amount of unacknowledged data received by the first machine from the second machine does exceed the threshold quantity, then determining whether the data represents a partial read.

11. The method of claim 10, wherein execution of the instructions by the one or more processors further causes:

after determining that the data represents a partial read, refraining from sending an explicit acknowledgement in response to said read operation in order to see if an implicit acknowledgment can be sent before a subsequent read operation.

12. The method of claim 11, wherein the data is a first set of data, and wherein execution of the instructions by the one or more processors further causes:

performing a read operation to read a second set of data from a third buffer that has a particular capacity, wherein the second set of data was written into the third buffer by a DMA mechanism in response to the second set of data being written into a fourth buffer at the second machine; and if a partial read has been encountered since the last explicit acknowledgement sent to the second machine, then sending an explicit acknowledgement to the second machine that acknowledges that both the first set of data and the second set of data have been read by the first machine.

13. The method of claim 10, wherein execution of the instructions by the one or more processors further causes:

if the data does not represent a partial read, then sending an explicit acknowledgement to the second machine acknowledging that the data was read from the first buffer.

14. The method of claim 1, wherein the acknowledgement is an explicit acknowledgement.

* * * * *

UNITED STATES PATENT AND TRADEMARK OFFICE
CERTIFICATE OF CORRECTION

PATENT NO. : 7,133,902 B2 Page 1 of 1
APPLICATION NO. : 10/641513
DATED : November 7, 2006
INVENTOR(S) : Debashis Saha et al.

It is certified that error appears in the above-identified patent and that said Letters Patent is hereby corrected as shown below:

TITLE PAGE, ITEM (60)
RELATED U.S. APPLICATION DATA

Delete "Provisional" and insert --Continuation-in-part of--.

Signed and Sealed this

Sixteenth Day of October, 2007

JON W. DUDAS
*Director of the United States Patent and Trademark Office*